(12) United States Patent
Singh et al.

(10) Patent No.: US 9,222,560 B2
(45) Date of Patent: Dec. 29, 2015

(54) TWO MODE CONTINUOUSLY VARIABLE TRANSMISSION

(71) Applicant: GM Global Technology Operations LLC, Detroit, MI (US)

(72) Inventors: Tejinder Singh, Commerce Township, MI (US); Pete R. Garcia, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 4 days.

(21) Appl. No.: 14/257,573

(22) Filed: Apr. 21, 2014

(65) Prior Publication Data

US 2015/0300469 A1    Oct. 22, 2015

(51) Int. Cl.
*F16H 37/02*    (2006.01)

(52) U.S. Cl.
CPC ........ *F16H 37/022* (2013.01); *F16H 2037/025* (2013.01); *F16H 2200/006* (2013.01); *F16H 2200/201* (2013.01); *F16H 2200/2041* (2013.01); *F16H 2200/2097* (2013.01)

(58) Field of Classification Search
CPC ............... F16H 37/022; F16H 37/025; F16H 2200/201; F16H 2200/2041; F16H 2200/006; F16H 2200/2097
USPC ......... 475/207, 210, 213, 214, 219, 302, 275, 475/276, 284
See application file for complete search history.

(56) References Cited

U.S. PATENT DOCUMENTS

| | | | | |
|---|---|---|---|---|
| 5,961,415 A * | 10/1999 | Justice | .................... | F16H 7/065 475/214 |
| 5,980,414 A * | 11/1999 | Larkin | ................ | F16H 37/0846 475/211 |
| 6,106,428 A * | 8/2000 | Koneda | ................. | F16H 37/022 475/210 |
| 6,358,178 B1 * | 3/2002 | Wittkopp | .............. | F16H 37/086 475/207 |
| 7,238,135 B2 * | 7/2007 | Coffey | ................ | F16H 37/0846 475/210 |
| 8,226,518 B2 * | 7/2012 | Parraga Gimeno | . | F16H 37/0846 475/210 |
| 9,052,000 B2 * | 6/2015 | Cooper | .................... | F16H 15/52 |
| 2004/0082421 A1 * | 4/2004 | Wafzig | .................. | F16H 37/086 475/207 |
| 2008/0194372 A1 * | 8/2008 | Glockler | ............. | F16H 37/0846 475/210 |
| 2015/0065288 A1 * | 3/2015 | Mellet | ....................... | F16H 9/12 475/210 |

* cited by examiner

*Primary Examiner* — Roger Pang (57) ABSTRACT

A two mode automatic transmission for a motor vehicle includes a variable ratio component, a plurality of planetary gear assemblies, a chain drive assembly and a plurality of torque transmitting devices. A first planetary gear assembly is associated with an input shaft, a first clutch and a first brake and provides forward and reverse gears. The variable ratio component is driven by the output of the first planetary gear assembly and drives the second planetary gear assembly. The second planetary gear assembly, which may be either a simple or compound planetary assembly, is associated with a second clutch and a second brake and drives the chain drive assembly. The output of the chain drive assembly drives a third planetary gear assembly which is associated with an output shaft.

18 Claims, 6 Drawing Sheets

FIG. 1

| GEAR STATE | GEAR RATIO | BRAKE 98 | CLUTCH 94 | BRAKE 96 | CLUTCH 92 | VAR1 40 |
|---|---|---|---|---|---|---|
| REV | -9.700 | X |  | X |  | 2.2 |
| N |  |  |  |  |  |  |
| 1ST | 14.551 | X |  |  | X | 2.2 |
| 2ND | 9.921 | X |  |  | X | 1.5 |
| 3RD | 6.945 | X |  |  | X | 1.05 |
| 4TH | 4.630 | X |  |  | X | 0.7 |
| 5TH | 7.275 |  | X |  | X | 2.2 |
| 6TH | 4.630 |  | X |  | X | 1.4 |
| 7TH | 2.910 |  | X |  | X | 0.88 |
| 8TH | 1.984 |  | X |  | X | 0.6 |

X = ON - ENGAGED CARRYING TORQUE

TWO MODE CONTINUOUSLY VARIABLE TRANSMISSION

FIELD

The present disclosure relates to an automatic transmission for a motor vehicle and more particularly to a two mode automatic transmission for a motor vehicle having first planetary gear assembly, a variable ratio component, a second planetary gear assembly, a chain drive and a third planetary gear assembly.

BACKGROUND

The statements in this section merely provide background information related to the present disclosure and may or may not constitute prior art.

Because of packaging benefits and weight reduction which generally results in improved performance, front wheel drive vehicles have proven popular with consumers. The most visible packaging benefit is the reduction or elimination of the driveline hump in the middle of the passenger compartment and the weight reduction is primarily the result of the elimination of the propeller (prop) shaft to the rear wheels. Both of these benefits have been embraced by consumers.

Like any engineering solution, a front wheel drive equipped vehicle is not without challenges and trade offs. The placement of the engine, transmission, differential and drive axles, as well as steering components, all in the forward portion of the motor vehicle does, however, present design and packaging challenges which are generally greater than those encountered in rear wheel drive vehicles.

For example, certain transmission configurations, because of their tandem gear arrangements, occupy significant length along the torque flow path, that is, from input to output. Accommodation of such a transmission in a vehicle, oriented either transversely or longitudinally, will often determine the type and size of vehicle in which it may be used. Alternatively, it may be necessary to slightly reduce passenger compartment volume to accommodate a certain transmission.

From the foregoing, it is apparent that the overall (exterior) size as well as shape of a transmission will often impact the design as well as the type of vehicle with which it is used. It is thus also apparent that improvements, especially those directed to providing a transmission having a physical arrangement of components and an overall shape and size well adapted to installation in an engine compartment of a motor vehicle, are desirable and the present invention is so directed.

SUMMARY

The present invention provides a two mode automatic transmission for a motor vehicle having a variable ratio component such as a dual cone pulley and belt assembly or a variator, a plurality of planetary gear assemblies, a chain drive and a plurality of torque transmitting devices. A first planetary gear assembly is associated with an input shaft, a first clutch and a first brake and provides forward and reverse gears. The variable ratio component is driven by the output of the first planetary gear assembly and drives the second planetary gear assembly. The second planetary gear assembly, which may be either a simple or compound planetary assembly, is associated with a second clutch and a second brake and drives the chain drive assembly. The output of the chain drive assembly drives a third planetary gear assembly which is associated with an output shaft.

The input shaft, the first planetary gear assembly and the input of the variable ratio component reside on a first axis, the output of the variable ratio component, the second planetary gear assembly and the input to the chain drive assembly reside on a second axis parallel to and spaced from the first axis and the output of the chain drive assembly, the third planetary gear assembly and output shaft reside on a third axis parallel to and spaced from both the first and second axes. Additional embodiments with the transmission components arranged on four parallel axes are also disclosed.

Thus it is an aspect of the present invention to provide an automatic motor vehicle transmission having a variable ratio component, a plurality of planetary gear assemblies and a plurality of torque transmitting devices.

It is a further aspect of the present invention to provide an automatic motor vehicle transmission having a variable ratio component such as a variator or belt and cone assembly, a plurality of planetary gear assemblies and a plurality of torque transmitting devices.

It is a still further aspect of the present invention to provide an automatic motor vehicle transmission having a variable ratio component, three planetary gear assemblies and torque transmitting devices.

It is a still further aspect of the present invention to provide an automatic motor vehicle transmission having a variable ratio component, three planetary gear assemblies and four torque transmitting devices.

It is a still further aspect of the present invention to provide an automatic motor vehicle transmission having a variable ratio component, three planetary gear assemblies, two clutches and two brakes.

It is a still further aspect of the present invention to provide an automatic motor vehicle transmission having a variable ratio component, three planetary gear assemblies, four torque transmitting devices and a chain drive assembly.

It is a still further aspect of the present invention to provide an automatic motor vehicle transmission having components arranged on three parallel, spaced apart axes.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
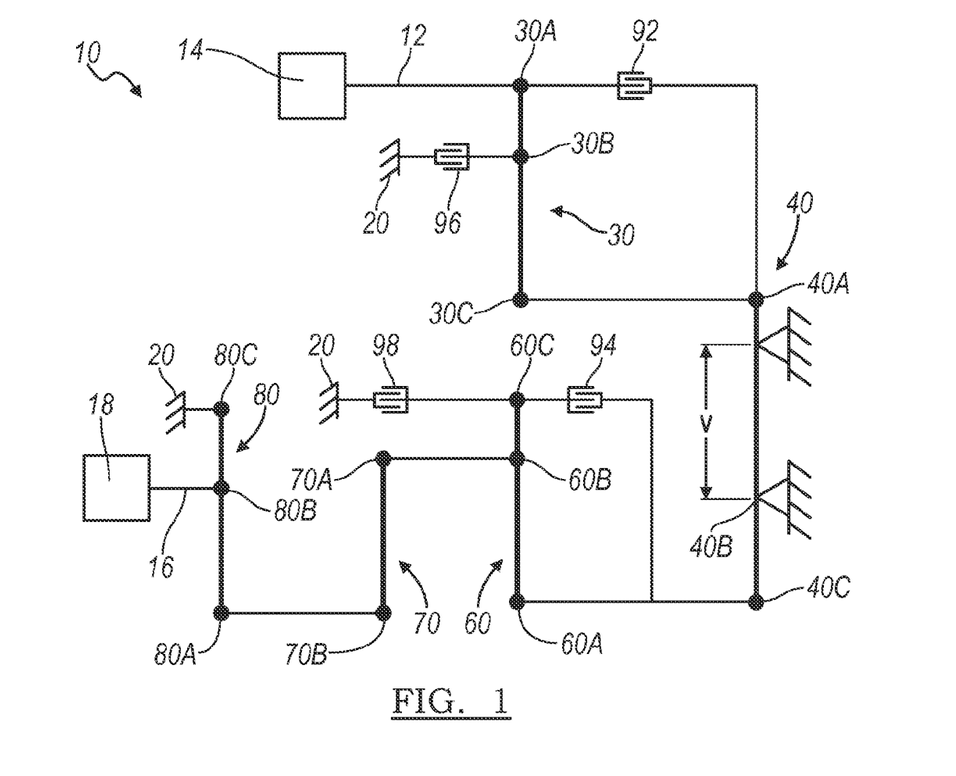
FIG. 1 is a lever diagram of a two mode continuously variable automatic transmission having a plurality of planetary gear assemblies, clutches and brakes.

With reference to FIG. 1, a two mode, continuously variable automatic transmission having a variable ratio component, a plurality of planetary gear assemblies and torque transmitting devices and a chain drive according to the present invention is illustrated in a lever diagram and designated by the reference number 10. A lever diagram is a schematic representation of the components of an automatic transmission wherein a planetary gear assembly is represented by a vertical bar or lever and the components of the planetary gear assembly such as the sun gear, the planet gear carrier and the ring gear are represented by nodes. The relative lengths of the vertical bars between the nodes represent the ratios between the components. A chain drive assembly is represented by two nodes: an input node and an output node. In the case of the variable ratio component, it includes an input node and an output node and two pivot points represent the limiting, i.e., upper and lower input to output speed ratios, which it provides. Mechanical couplings or interconnections between the nodes such as shafts or quills are represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The automatic transmission 10 includes an input shaft 12 which typically will be coupled to and driven by a prime mover 14 such as a gasoline, Diesel, flex fuel or hybrid engine or power plant and an output shaft 16 which will typically be coupled to and drive a differential assembly 18. The components of the automatic transmission 10 are located, secured and protected within a cast metal housing 20 which is referred to as "ground" with reference to FIG. 1.

The automatic transmission 10 includes a unique combination of levers and nodes. The input shaft 12 is coupled to a first node 30A of a first planetary gear assembly 30. The first planetary gear assembly 30 also includes a second node 30B and a third node 30C. The third node 30C of the first planetary gear assembly 30 is coupled to a first node 40A of a variable ratio component 40. The variable ratio component 40 is a mechanical device capable of providing a continuously variable input to output speed ratio over a limited range indicated by the letter "V" in FIG. 1. The variable ratio component 40 is preferably a two pulley and belt or chain device but may also be a variator. The variable ratio component 40 also includes a second node 40B having a variable or moveable position which represents the variable input to output ratio provided by the component 40 and a third node 40C.

The third node 40C of the variable ratio component 40 is coupled to a first node 60A of a second planetary gear assembly 60. The second planetary gear assembly 60 also includes a second node 60B and a third node 60C. The second node 60B of the second planetary gear assembly 50 is coupled to and drives a first node 70A of a chain drive assembly 70 having a second node 70B. The second node 70B of the chain drive assembly 70 is coupled to and drives a first node 80A of a third planetary gear assembly 80. The third planetary gear assembly 80 also includes a second node 80B and a third node 80C. The second node 80B is coupled to and drives the output shaft 16 and the differential assembly 18.

Additionally, the automatic transmission 10 includes four selectively engageable torque transmitting devices, namely, two friction clutches and two friction brakes. As utilized herein, the term "friction clutch" refers to any torque transmitting device having a first plurality of rotatable friction plates or discs associated with a first member which are interleaved with a second plurality of friction plates or discs associated with a second member which are compressed by an operator or actuator to transmit torque between the two members. The term "friction brake" refers to a similar device in which one of the pluralities of plates or discs and associated member are stationary. It should be appreciated, however, that other clutch and brake configurations are within the purview of this invention.

A first friction clutch 92 is operably disposed between the first node 30A of the first planetary gear assembly 30 and the first node 40A of the variable ratio component 40. A second friction clutch 94 is operably disposed between the third node 40C of the variable ratio component 40 and the third node 60C of the second planetary gear assembly 60. It should be understood that the first friction clutch 92 and the second friction clutch 94 can be arranged in a variety of ways with the associated first planetary gear assembly 30 and the second planetary gear assembly 60, respectively, as long as they selectively connect any two nodes of the subject gear assembly. A first friction brake 96 is operable disposed between the second node 30B of the first planetary gear assembly 30 and ground, i.e., the stationary housing 20. A second friction brake 98 is operable disposed between the third node 60C of the second planetary gear assembly 60 and ground, i.e., the stationary housing 20.

Figure 2:
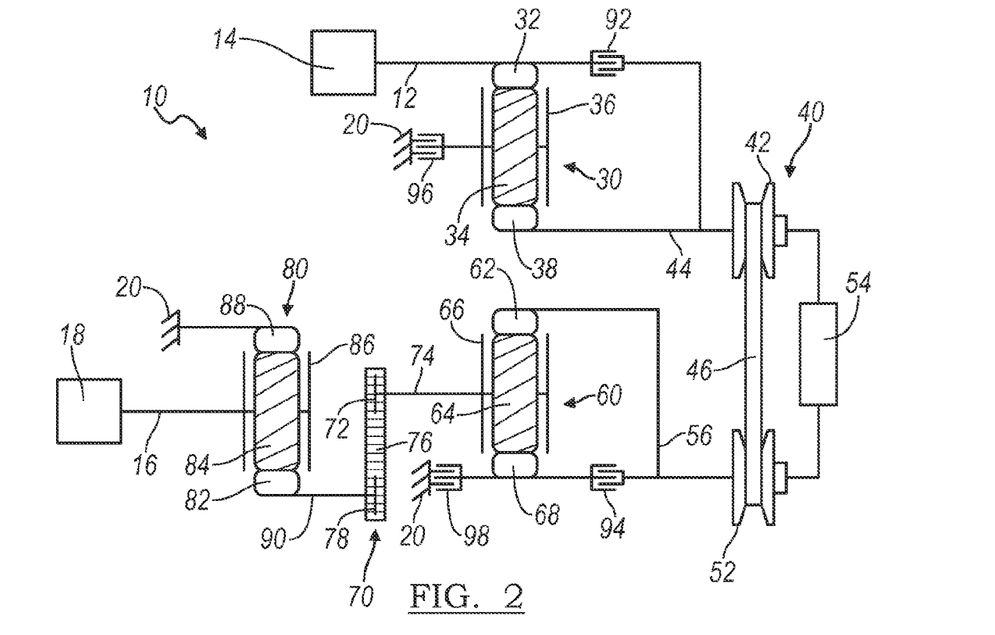
FIG. 2 is a stick diagram of a two mode continuously variable automatic transmission having three planetary gear assemblies, two clutches and two brakes.

Referring now to FIG. 2, the automatic transmission 10 is a two mode continuously variable automatic transmission (CVT) having three simple planetary gear assemblies, two clutches, two brakes and a chain drive assembly. As noted, the automatic transmission 10 includes the cast, typically metal housing 20 which locates, encloses and protects the various components of the automatic transmission 10. The housing 20 includes a plethora of apertures, passageways, shoulders and flanges, among other features, which, as noted, position and support these components. The automatic transmission 10 includes the transmission input shaft 12 which receives drive torque from the prime mover 14 and the transmission output shaft 16 which delivers torque to the differential assembly 18.

The input shaft 12 is coupled to and drives a first ring gear 32 of the first, simple planetary gear assembly 30. The first planetary gear assembly 30 also includes a plurality of planet gears 34 (one of which is illustrated in FIG. 2) which are freely rotatably supported in a first planet gear carrier 36. The first planet gear carrier 36 is selectively grounded to the stationary housing 20 by the first friction brake 96. The first planetary gear assembly 30 also includes a first sun gear 38 which is coupled to and drives an input member such as a first adjustable cone pulley 42 of the variable ratio component 40 through a first member, shaft or quill 44. Operably disposed between and selectively connecting the first member, shaft or quill 44 (and the first sun gear 38 and the input member 42 of the variable ratio component 40) with the first ring gear 32 of the first planetary gear assembly 30 is the first friction clutch 92.

The variable ratio component 40 also includes a belt or chain 46 which drivingly connects the first adjustable cone pulley 42, at an adjustable ratio, to an output member such as a second adjustable cone pulley 52. The effective diameters of the two cone pulleys 42 and 52 are oppositely adjusted by a mechanical controller or actuator 54. The second adjustable cone pulley 52 is coupled to an drives a second member, shaft or quill 56 which, in turn, is coupled to and drives a second ring gear 62 of the second, simple planetary gear assembly 60. The second planetary gear assembly 60 also includes a plurality of planet gears 64 (one of which is illustrated in FIG. 2) which are freely rotatably supported in a second planet gear carrier 66 and which mesh with both the second ring gear 62 and a second sun gear 68. The second sun gear 68 is selectively connected to the second member, shaft or quill 56 by the second friction clutch 94 and also selectively grounded to the stationary housing by the second friction brake 98.

The second planet gear carrier 66 is coupled to and drives an input sprocket 72 of the chain drive assembly 70 through a third member, shaft or quill 74. The chain drive assembly 70 includes a multi-link chain 76 which engages and transfers torque from the input sprocket 72 to an output sprocket 78. Utilizing sprockets 72 and 78 of different outside (effective) diameters, the chain drive assembly 70 may achieve a speed increase of decrease, on the order of, for example, 0.8 to 1.2, if desired. It should be appreciated that a transfer gear set may be substituted for the chain drive assembly and that a speed change is also possible utilizing such gears.

The output sprocket 78 of the chain drive assembly 70 is coupled to and drives a third sun gear 82 of the third, simple planetary gear assembly 80 through a fourth member, shaft or quill 90. The third planetary gear assembly 80 also includes a plurality of planet gears 84 (one of which is illustrated in FIG. 2) which are freely rotatably supported in a third planet gear carrier 86. The planet gears 86 mesh with both the third sun gear 82 and a third ring gear 88 which is secured (grounded) to the housing 20 and is thus stationary. The third planet gear carrier 86 is coupled to and drives the output shaft 16 and the final drive assembly 18.

Figure 3:
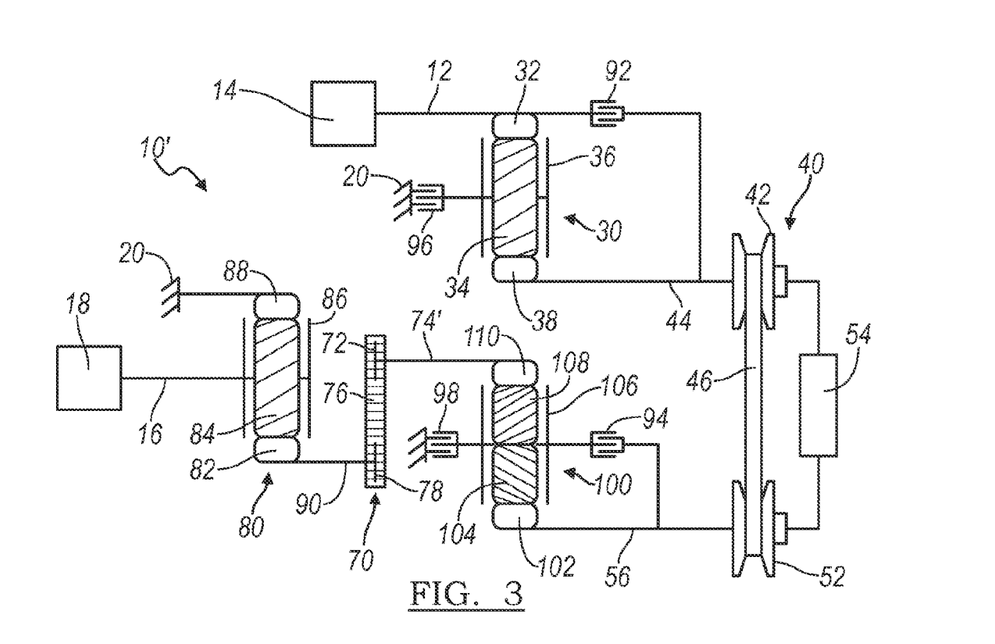
FIG. 3 is a stick diagram of a two mode continuously variable automatic transmission having three planetary gear assemblies one of which is a compound planetary gear assembly, two clutches and two brakes.

Referring now to FIG. 3, another embodiment of the automatic transmission 10' according to the present invention is illustrated. The automatic transmission 10' is identical in most respects to the automatic transmission 10 described directly above except that the second, simple planetary gear assembly 60 is replaced by a compound planetary gear assembly 100. As such the automatic transmission 10 includes the input shaft 12, the output shaft 16, the first, simple planetary gear assembly 30, the variable ratio component 40, the chain drive assembly 70 and the third, simple planetary gear assembly 80, as well as the friction clutches 92 and 94, the friction brakes 96 and 98 and the members, shafts or quills 44, 56, 74 and 90.

The second, compound planetary gear assembly 100 includes a second sun gear 102 which is coupled to and driven by the second member, shaft or quill 56 which, in turn, is driven by the second adjustable cone pulley 52 of the variable ratio component 40. The second, compound planetary gear assembly 100 also includes a first plurality of planet gears 104 (one of which is illustrated in FIG. 2) which are freely rotatably supported in a second, compound planet gear carrier 106 and which mesh with both the second sun gear 102 and a second plurality of planet gears 108 (one of which is illustrated in FIG. 3) which are also freely rotatably supported in the second, compound planet gear carrier 106 and which mesh with both a respective one of the first plurality of planet gears 104 and a second ring gear 110. The second compound planet gear carrier 106 is selectively connected to the second member, shaft or quill 56 by the second friction clutch 94 and also selectively grounded to the stationary housing 20 by the second friction brake 98. The second ring gear 110 is coupled to and drives the input chain sprocket 72 of the chain drive assembly 70 through a third member, shaft or quill 74'.

Figure 4:
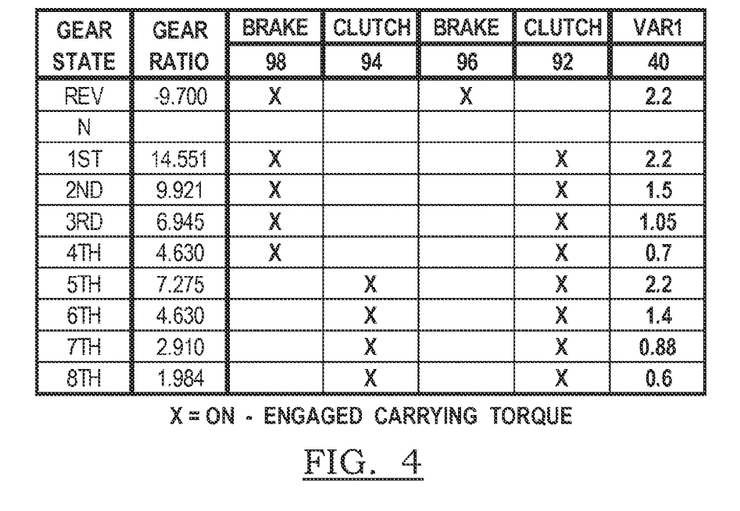
FIG. 4 is a truth table depicting the engagement and release of the clutches and brakes as well as the nominal gears (speed ratios) provided by the automatic transmission according to the present invention illustrated in FIG. 3.

Referring now to FIG. 4, operation of the embodiment 10' of the automatic transmission will now be described. FIG. 4 presents the operational states of the first and second clutches 92 and 94 and the first and second brakes 96 and 98 as well as the ratio provided by the variable ratio component 40 and the overall ratio from the input shaft 12 to the output shaft 16 of the automatic transmission 10'. The sequence of operation is also shown as the automatic transmission 10' upshifts from a lower gear to a higher gear, and vice versa, an "X" in a particular row (corresponding to a given gear) and a particular column (representing a specific clutch or brake) indicating that the specified device is active, i.e., engaged, and carrying torque.

Figure 5:
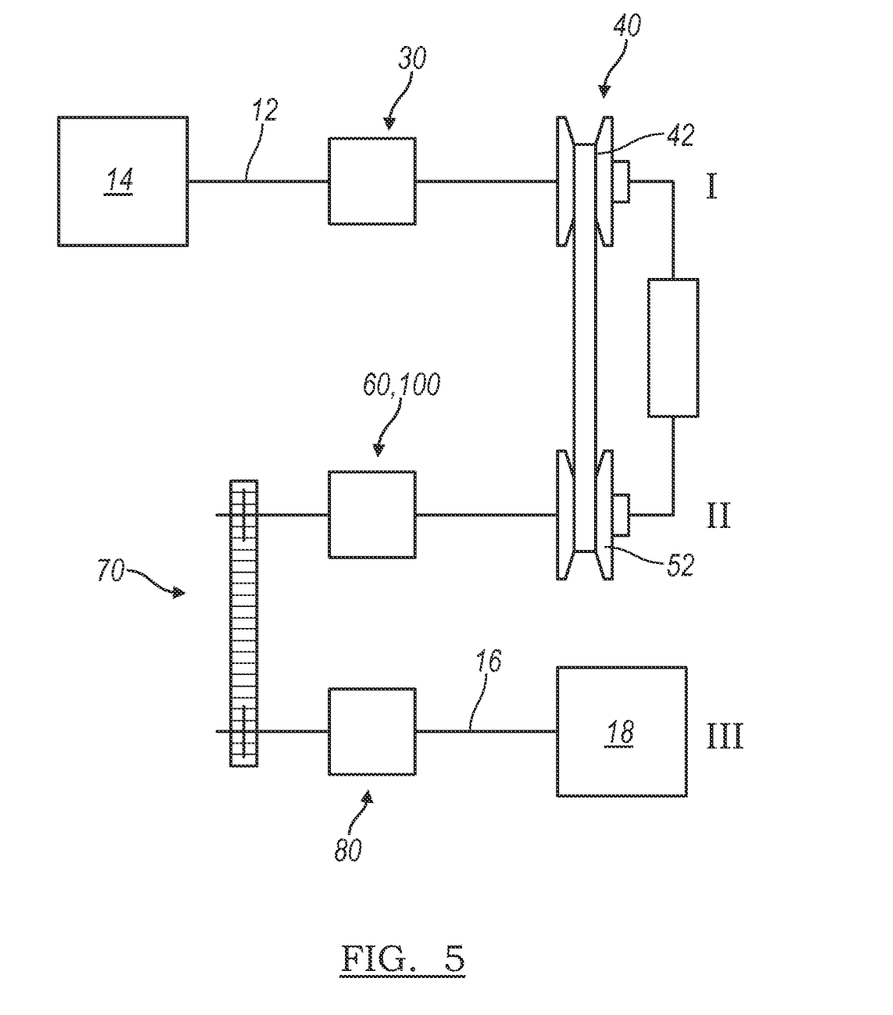
FIG. 5 is a schematic view of the automatic transmission according to the present invention illustrating the three axes about and along which components are disposed.

Referring now to FIG. 5, a schematic diagram of the automatic transmissions 10 and 10' clearly illustrate the three axis configuration thereof. On a first axis "I" are disposed the prime mover 14 and, within the housing, the input shaft 12, the first planetary gear assembly 30 (as well as the associated clutch and brake) and the input to the variable ratio component 40. On a second axis "II" are disposed the output of the variable ratio component 40, the second planetary assemblies 60 and 100 (as well as the associated clutch and brake) and the input to the chain drive assembly 70. On a third axis "III" are disposed the output of the chain drive assembly 70, the third planetary gear assembly 80 and the output shaft 16.

Figure 6:
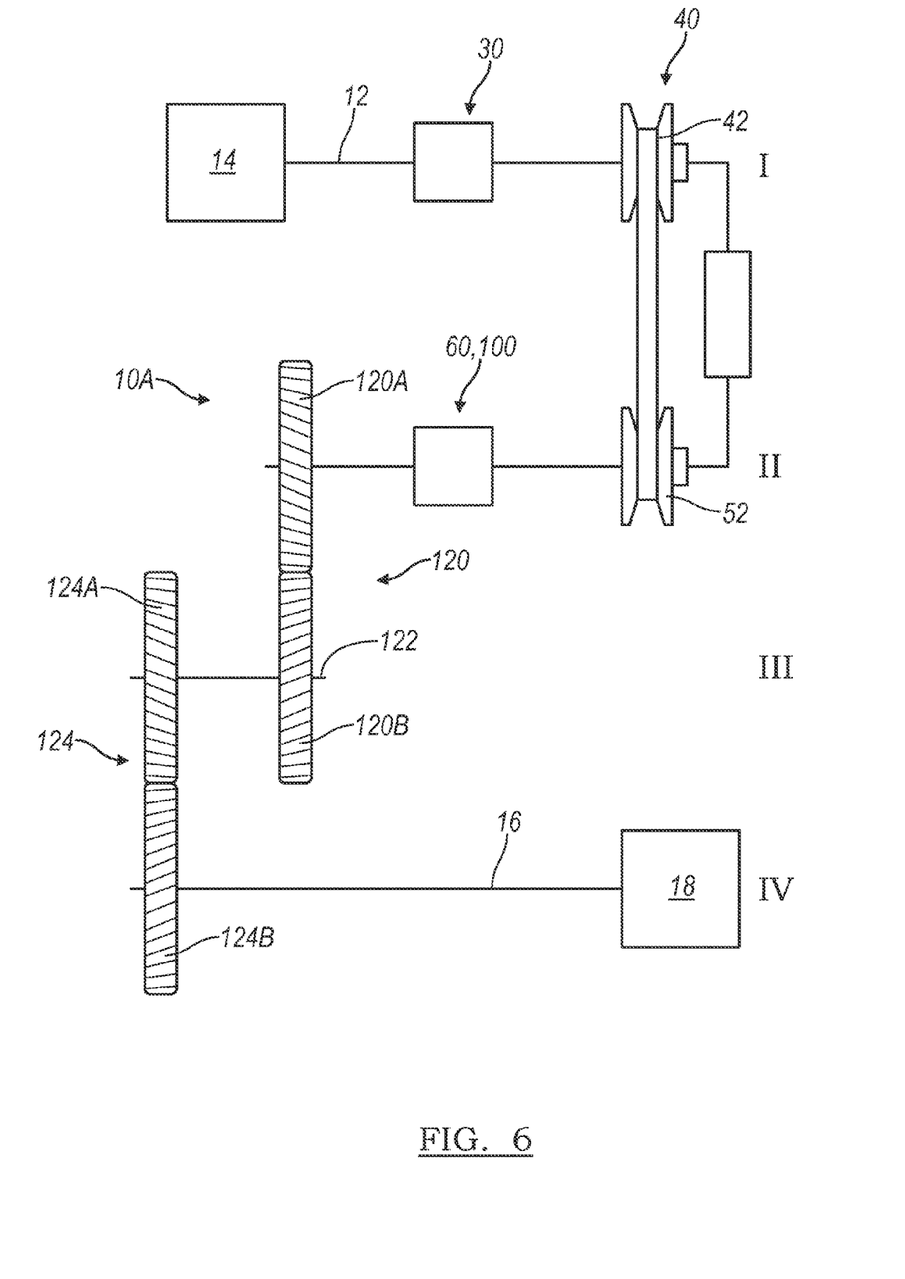
FIG. 6 is a schematic view of another embodiment of the automatic transmission according to the present invention illustrating four axes about and along which components are disposed.

Referring now to FIG. 6, a schematic diagram of an automatic transmission 10A illustrates an embodiment having components disposed along and about four parallel axes. The transmission 10A is similar in most respects to the transmissions 10 and 10' described directly above with reference to FIG. 5 except that in place of the chain drive assembly 70 between the second axis "II" and the third axis "III," a first pair of transfer gears 120 including a first or drive gear 120A which is disposed on the second axis "II" mates with a second or driven gear 120B on an intermediate shaft 122 which defines a third axis "III." A second pair of transfer gears 124 including a drive gear 124A which is coupled to the intermediate shaft 122 on the third axis "III," drives a second or driven gear 124B of the second pair of transfer gears 124 which is disposed on a fourth axis "IV" and which includes the output shaft 16 and the differential assembly 18.

Figure 7:
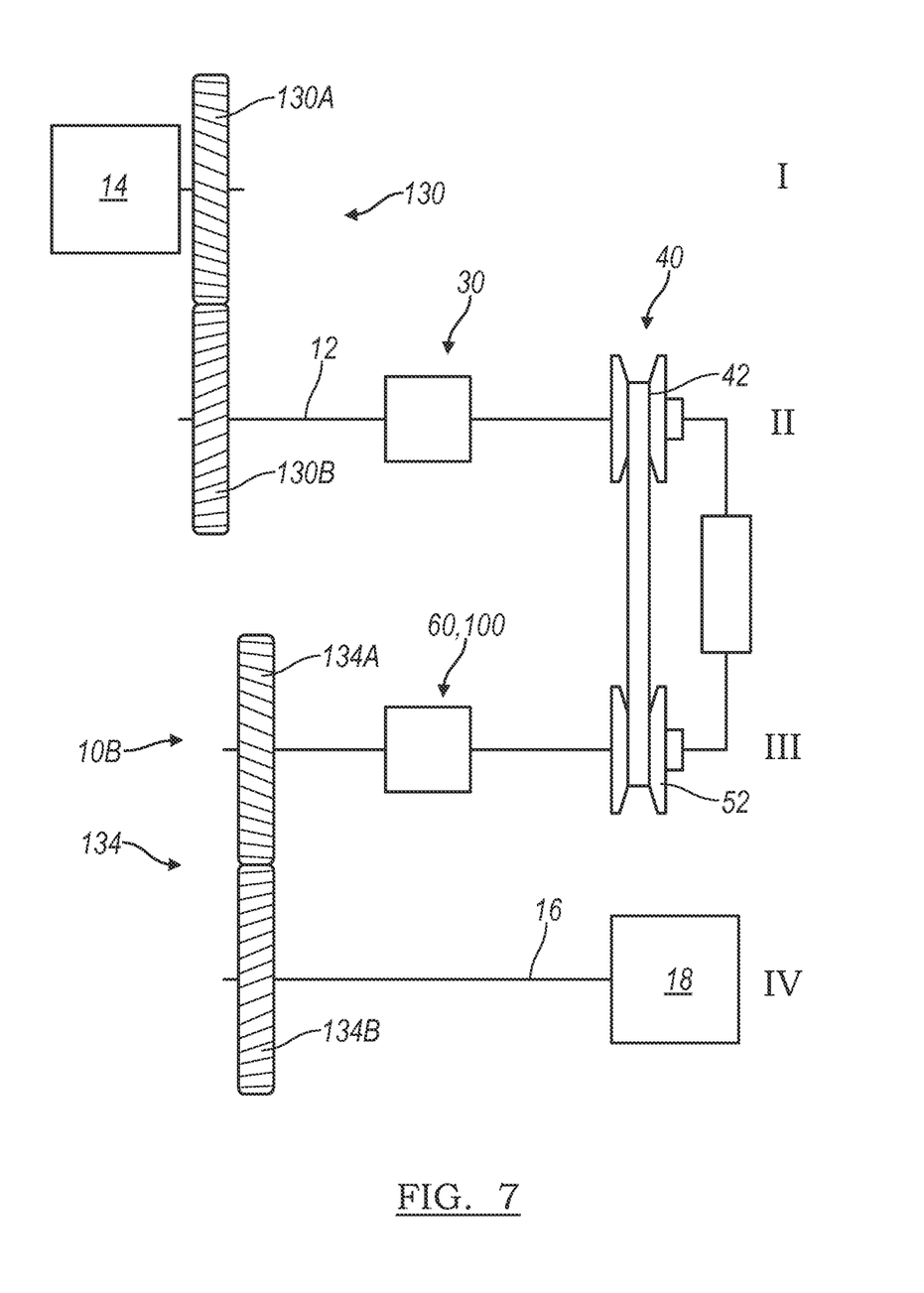
FIG. 7 is a schematic view of yet another embodiment of the automatic transmission according to the present invention illustrating four axes about and along which components are disposed.

Referring now to FIG. 7, a schematic diagram of yet another automatic transmission 10B illustrates another embodiment having components disposed along and about four parallel axes. The transmission 10B is similar in most respects to the transmission 10 and 10' except that a first pair of transfer gears 130 are added which transfer torque from the first axis "I" which contains the prime mover 14 (and a torque converter, not illustrated) and a first or drive gear 130A of the first pair of transfer gears 130. On a parallel, second axis "II" are the driven gear 130B of the first pair of transfer gears 130, the first planetary gear assembly 30 (as well as the associated clutch and brake) and the drive pulley 42 of the variable ratio component 40. On a third parallel axis "III," are the driven pulley 52 of the variable ratio component 40, either the planetary gear assembly 60 or 100 (as well as the associated clutch and brake) and a first or drive gear 134A of a second pair of transfer gears 134. A driven gear 134B of the second pair of transfer gears 134 resides on a fourth axis "IV" with the output shaft 16 and the differential assembly 18.

Figure 8:
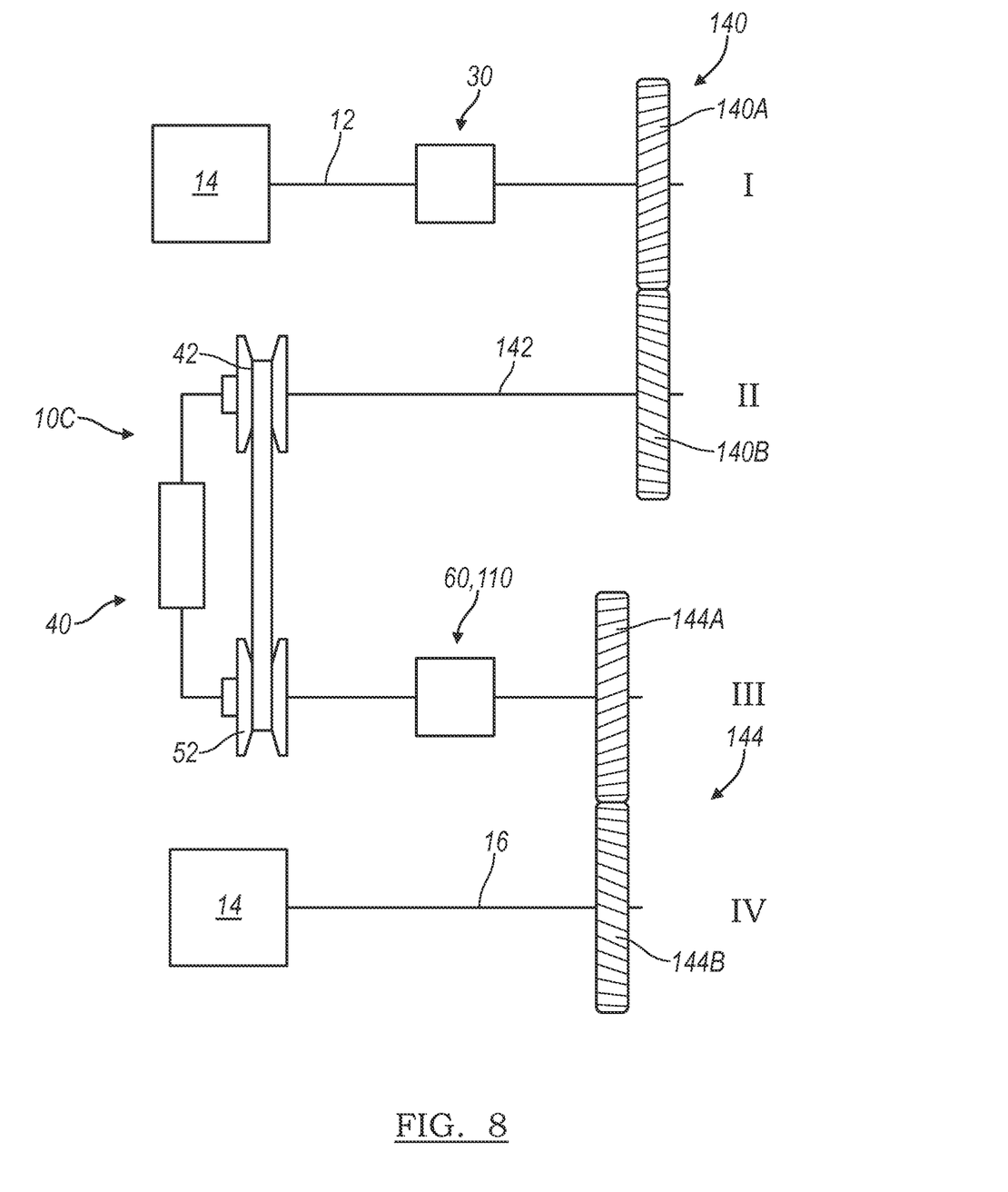
FIG. 8 is a schematic view of still another embodiment of the automatic transmission according to the present invention illustrating four axes about and along which components are disposed

Referring now to FIG. 8, a schematic diagram of still another automatic transmission 10C illustrates another embodiment having components disposed along and about four parallel axes. The transmission 10C is similar in most respects to the transmission 10 and 10' as well as the transmission 10B, except that a first or drive gear 140A of a first pair of transfer gears 140 is disposed on the first axis "I" after the first planetary gear assembly 30 (as well as the associated clutch and brake) which also contains the prime mover 14 (and a torque converter, not illustrated). On a parallel, second axis "II" are the driven gear 140B of the first pair of transfer gears 140 and the drive pulley 42 of the variable ratio component 40 which are both coupled to a shaft or quill 142. On a third parallel axis "III" are the driven pulley 52 of the variable ratio component 40, either the planetary gear assembly 60 or 100 (as well as the associated clutch and brake) and a first or drive gear 144A of a second pair of transfer gears 144. A driven gear 144B of the second pair of transfer gears 134 resides on a fourth axis "IV" with the output shaft 16 and the differential assembly 18.

It will be appreciated that the automatic transmissions 10, 10', 10A, 10B and 10C according to the present invention provide very low spin losses in the clutches 92 and 94 and the brakes 96 and 98 because of the nominal speed differentials across them. Gear losses are also low and all of the transmissions exhibit good scalability due to the arrangement of gearing, clutches and brakes. Overall efficiency is also good because both the first and second planetary gear assemblies are locked up in the higher, forward gear ratios. Additionally, although described above as simple planetary gear assemblies, with the exception of the second, compound planetary gear assembly 100 in FIG. 3, it should be understood that all the planetary gear assemblies 30, 60 and 80 may be either simple or compound.

The description of the invention is merely exemplary in nature and variations that do not depart from the gist of the invention are intended to be within the scope of the invention. Such variations are not to be regarded as a departure from the spirit and scope of the invention.

What is claimed is:

1. A continuously variable automatic transmission for a motor vehicle comprising, in combination,
    a housing,
    an input member,
    an output member,
    a first planetary gear assembly having a first, a second and a third element, said first element coupled to said input member,
    a variable ratio component having an input and an output, said input coupled to said third element of said first planetary gear assembly,
    a second planetary gear assembly having a first, a second and a third element, said first element coupled to said output of said variable ratio component,
    a chain drive assembly having an input and an output, said input coupled to said second element of said second planetary gear assembly,
    a third planetary gear assembly having a first, a second and a third element, said first element coupled to said output of said chain drive assembly, said second element coupled to said output member and said third element coupled to said housing,
    a first clutch selectively connecting said first element of said first planetary gear assembly with said third element of said first planetary gear assembly,
    a first brake selectively connecting said second element of said first planetary gear assembly with said housing,
    a second clutch selectively connecting said first element of said second planetary gear assembly with said third element of said second planetary gear assembly, and
    a second brake selectively connecting said third element of said second planetary gear assembly with said housing.

2. The continuously variable automatic transmission for a motor vehicle of claim 1 wherein said variable ratio component includes an adjustable cone pulley input, one of a belt and chain and an adjustable cone pulley output.

3. The continuously variable automatic transmission for a motor vehicle of claim 1 wherein said input member, said first planetary gear assembly and said input of said variable ratio component are on a first axis, said output of said variable ratio component, said second planetary gear assembly and said input of said chain drive assembly are on a second axis and said output of said chain drive assembly, said third planetary gear assembly and said output member are on a third axis.

4. The continuously variable automatic transmission for a motor vehicle of claim 3 wherein said second axis is parallel to and spaced from said first axis and said third axis is parallel to and spaced from both said first axis and said second axis.

5. The continuously variable automatic transmission for a motor vehicle of claim 1 wherein said first element of said first planetary gear assembly is a ring gear, said second element of said first planetary gear assembly is a planet gear carrier and said third element is a sun gear.

6. The continuously variable automatic transmission for a motor vehicle of claim 1 wherein said first element of said second planetary gear assembly is a ring gear, said second element of said second planetary gear assembly is a planet gear carrier and said third element of said second planetary gear assembly is a sun gear.

7. The continuously variable automatic transmission for a motor vehicle of claim 1 wherein said first element of said third planetary gear assembly is a sun gear, said second element of said third planetary gear assembly is a planet gear carrier and said third element of said third planetary gear assembly is a ring gear.

8. A continuously variable automatic transmission for a motor vehicle comprising, in combination,
    an input member,
    an output member,
    a first planetary gear assembly having a first, a second and a third element, said first element coupled to said input member,
    a variable ratio component having an input and an output, said input coupled to said third element of said first planetary gear assembly,
    a second planetary gear assembly having a first, a second and a third element, said first element coupled to said output of said variable ratio component,
    a third planetary gear assembly having a first, a second and a third element, said first element driven by said second element of said second planetary gear assembly, said second element coupled to said output member and said third element is grounded,
    a first clutch selectively connecting said first element of said first planetary gear assembly with said third element of said first planetary gear assembly,
    a first brake selectively grounding said second element of said first planetary gear assembly, a second clutch selectively connecting said first element of said second planetary gear assembly with said third element of said second planetary gear assembly, and a second brake selectively grounding said third element of said second planetary gear assembly.

9. The continuously variable automatic transmission for a motor vehicle of claim 8 wherein said input member, said first planetary gear assembly and said input of said variable ratio component are on a first axis, said output of said variable ratio component, said second planetary gear assembly and an input of a chain drive assembly are on a second axis and an output of said chain drive assembly, said third planetary gear assembly and said output member are on a third axis.

10. The continuously variable automatic transmission for a motor vehicle of claim 8 further including a housing to which said third element of said third planetary gear assembly and said first and second brakes are connected.

11. The continuously variable automatic transmission for a motor vehicle of claim 8 wherein said variable ratio component includes an adjustable cone pulley input, a belt or chain and an adjustable cone pulley output.

12. The continuously variable automatic transmission for a motor vehicle of claim 8 wherein said first element of said first planetary gear assembly is a ring gear, said second element of said first planetary gear assembly is a planet gear carrier and said third element is a sun gear.

13. The continuously variable automatic transmission for a motor vehicle of claim 8 wherein said first element of said second planetary gear assembly is a ring gear, said second element of said second planetary gear assembly is a planet gear carrier and said third element of said second planetary gear assembly is a sun gear.

14. The continuously variable automatic transmission for a motor vehicle of claim 8 wherein said first element of said second planetary gear assembly is a sun gear, said second element of said second planetary gear assembly is a ring gear and said third element of said second planetary gear assembly is a planet gear carrier.

15. The continuously variable automatic transmission for a motor vehicle of claim 8 wherein said first element of said third planetary gear assembly is a sun gear, said second element of said third planetary gear assembly is a planet gear carrier and said third element of said third planetary gear assembly is a ring gear.

16. A continuously variable automatic transmission for a motor vehicle comprising, in combination, a stationary housing, an input shaft defining a first axis, an output shaft defining a third axis, a first planetary gear assembly disposed on said first axis and having a sun gear, a planet gear carrier and a ring gear, said ring gear coupled to said input shaft, a variable ratio component having an input and an output, said input coupled to said sun gear of said first planetary gear assembly, a second planetary gear assembly disposed on a second axis and having sun gear, a planet gear carrier and a ring gear, said ring gear coupled to said output of said variable ratio component, a chain drive assembly having an input disposed on said second axis and an output disposed on said third axis, said input coupled to said planet gear carrier of said second planetary gear assembly, a third planetary gear assembly disposed on said third axis and having a sun gear, a planet gear carrier and a ring gear, said sun gear coupled to said output of said chain drive assembly, said planet gear carrier coupled to said output shaft and said ring gear coupled to said stationary housing, a first clutch selectively connecting said sun gear of said first planetary gear assembly with said ring gear of said first planetary gear assembly, a first brake selectively connecting said planet gear carrier of said first planetary gear assembly to said stationary housing, a second clutch selectively connecting said sun gear of said second planetary gear assembly with said ring gear of said second planetary gear assembly, and a second brake selectively connecting said sun gear of said second planetary gear assembly to said stationary housing.

17. The continuously variable automatic transmission for a motor vehicle of claim 16 wherein said variable ratio component includes an adjustable cone pulley input and an adjustable cone pulley output.

18. The continuously variable automatic transmission for a motor vehicle of claim 16 wherein said chain drive assembly includes a drive sprocket on said second axis, a driven sprocket on said third axis and a chain engaging said drive sprocket and said driven sprocket.

* * * * *